(12) United States Patent
Han et al.

(10) Patent No.: US 11,318,925 B2
(45) Date of Patent: *May 3, 2022

(54) VEHICLE POWER DISTRIBUTION CONTROL METHOD, APPARATUS AND SYSTEM

(71) Applicant: Guangzhou Automobile Group Co., Ltd., Guangdong (CN)

(72) Inventors: Lingtao Han, Guangdong (CN); Chao Ding, Guangdong (CN); Qiang Ren, Guangdong (CN); Wei Xu, Guangdong (CN); Ted S Huang, Guangdong (CN); Chunyun Zheng, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 316 days.

This patent is subject to a terminal disclaimer.

(21) Appl. No.: 16/333,238

(22) PCT Filed: Apr. 26, 2018

(86) PCT No.: PCT/CN2018/084691
§ 371 (c)(1),
(2) Date: Mar. 14, 2019

(87) PCT Pub. No.: WO2018/196827
PCT Pub. Date: Nov. 1, 2018

(65) Prior Publication Data
US 2021/0276529 A1   Sep. 9, 2021

(30) Foreign Application Priority Data
Apr. 27, 2017   (CN) .......................... 201710288528.7

(51) Int. Cl.
*B60W 10/14* (2012.01)
*B60W 30/182* (2020.01)
(Continued)

(52) U.S. Cl.
CPC .......... *B60W 10/14* (2013.01); *B60W 10/119* (2013.01); *B60W 30/182* (2013.01);
(Continued)

(58) Field of Classification Search
CPC .. B60W 10/14; B60W 10/119; B60W 30/182; B60W 2552/35; B60W 2420/42;
(Continued)

(56) References Cited

U.S. PATENT DOCUMENTS 7,162,346 B2 * 1/2007 Berry .................... B60W 10/06
701/1
2010/0250049 A1 * 9/2010 Nihei .................... B60W 10/14
701/31.4

FOREIGN PATENT DOCUMENTS

CN           101553377 A        10/2009
CN           102673395 A         9/2012
(Continued)

*Primary Examiner* — Tisha D Lewis
(74) *Attorney, Agent, or Firm* — ScienBiziP, P.C.

(57) ABSTRACT

A vehicle power distribution control method, apparatus and system are provided. The method includes: acquiring an image of a road surface on which a vehicle drives currently, and recognizing, according to the image of the road surface, the type of the road surface on which the vehicle drives currently; starting a corresponding terrain mode in an all-terrain adaptive mode according to the current type of the road surface; determining a power distribution strategy corresponding to the current terrain mode according to a correspondence between terrain modes and preset power distribution strategies; and switching a center differential of the vehicle to a corresponding locking mode according to the current power distribution strategy, and distributing, in the locking mode, torques to front and rear axles of the vehicle according to a torque distribution curve corresponding to the current power distribution strategy. The front and (Continued)

rear axles of a four-wheel drive vehicle can be conveniently provided with adequate torques on different road surfaces.

16 Claims, 2 Drawing Sheets

(51) Int. Cl.
  *B60W 10/119* (2012.01)
  *G06T 7/40* (2017.01)
  *G06V 20/56* (2022.01)
  *B60K 17/348* (2006.01)

(52) U.S. Cl.
  CPC ............... *G06T 7/40* (2013.01); *G06V 20/56* (2022.01); *B60K 17/348* (2013.01); *B60W 2420/42* (2013.01); *B60W 2510/125* (2013.01); *B60W 2520/403* (2013.01); *B60W 2540/10* (2013.01); *B60W 2552/35* (2020.02); *B60W 2710/125* (2013.01); *G06T 2207/30252* (2013.01)

(58) Field of Classification Search
  CPC ..... B60W 2510/125; B60W 2520/403; B60W 2540/10; B60W 2710/125; G06K 9/00791; G06T 7/40; G06T 2207/30252
  See application file for complete search history.

(56) References Cited

FOREIGN PATENT DOCUMENTS

| | | |
|---|---|---|
| CN | 103796893 A | 5/2014 |
| CN | 104057954 A | 9/2014 |
| CN | 104125906 A | 10/2014 |
| CN | 105270263 A | 1/2016 |
| CN | 105683016 A | 6/2016 |
| CN | 106232449 A | 12/2016 |
| CN | 106274467 A | 1/2017 |
| CN | 107161151 A | 9/2017 |
| GB | 2502802 A | 12/2013 |
| GB | 201520482 | 1/2016 |
| GB | 2537884 A | 11/2016 |
| WO | 2016079190 A1 | 5/2016 |

* cited by examiner

VEHICLE POWER DISTRIBUTION CONTROL METHOD, APPARATUS AND SYSTEM

TECHNICAL FIELD

The present disclosure relates to the technical field of vehicle control, and more particularly to a vehicle power distribution control method, apparatus and system.

BACKGROUND

A four-wheel drive vehicle is a vehicle with front and rear differential linkage. Engine power can be transmitted to four tires, so the four wheels can be powered. That is to say, for the four-wheel drive vehicle, either the rear wheel or the front wheel may serve as, a drive wheel, and a drive system may automatically perform switching. For example, when the rear wheel of the vehicle is slipping, rear-wheel drive may be automatically switched to front-wheel drive. Therefore, the four-wheel drive vehicle has better off-road performance than a two-wheel drive vehicle.

The four-wheel drive system is mainly divided into two categories: half-time four-wheel drive and full-time four-wheel drive. The use of the half-time four-wheel drive can be divided into two states: one is two-wheel drive, where the vehicle has only two wheels to be powered; the other is four-wheel drive, where the front and rear axles of the vehicle are equally powered in a 50:50 ratio. The four-wheel drive structure is simple and fuel-efficient. The full-time four-wheel drive is a four-wheel drive system that keeps the four wheels of the vehicle always driven; the full-time four-wheel drive is more reliable, but large in fuel consumption. A timely four-wheel drive, also known as real-time four-wheel drive, is a technology developed in recent years. It is controlled by a computer chip to switch between two-wheel drive and four-wheel drive. The distinguishing feature of the timely four-wheel drive system is that it compensates for its shortcomings while inheriting the advantages of full-time four-wheel drive and time-sharing four-wheel drive.

However, when a four-wheel drive vehicle drives on road surfaces of different terrains, such as urban roads, snow, mud, or sand, due to the complicated road conditions, a power distribution unit of the traditional four-wheel drive vehicle is still difficult to guarantee that the vehicle can drive at its best.

SUMMARY

In view of this, the embodiments of the present disclosure provide a vehicle power distribution control method, apparatus and system, facilitating that front and rear axles of a four-wheel drive vehicle can be provided with adequate torques on different road surfaces.

According to an embodiment of the present disclosure, provides a vehicle power distribution control method is provided, and the method may include the following steps:

An image of a road surface on which a vehicle drives currently is acquired, and the type of the road surface on which the vehicle drives currently is recognized according to the image of the road surface.

A corresponding terrain mode in an all-terrain adaptive mode is started according to the current type of the road surface, and a power distribution strategy corresponding to the current terrain mode is determined according to a correspondence between terrain modes and preset power distribution strategies, the terrain mode in the all-terrain adaptive mode including at least two of a common terrain mode, a snow mode, a mud mode, and a sand mode.

A center differential of the vehicle is switched to a corresponding locking mode according to the current power distribution strategy, and torques are distributed to front and rear axles of the vehicle according to a torque distribution curve corresponding to the current power distribution strategy.

The torque distribution curve is a function curve using a throttle position as a variable and a torque proportion of a driven axle as an output.

According to an embodiment of the present disclosure, a vehicle power distribution control apparatus is also provided, and the apparatus may include:

a road surface recognition module, configured to acquire an image of a road surface on which a vehicle drives currently, and recognize, according to the image of the road surface, the type of the road surface on which the vehicle drives currently;

a power distribution strategy determining module, configured to start a corresponding terrain mode in an all-terrain adaptive mode according to the current type of the road surface, and determine a power distribution strategy corresponding to the current terrain mode according to a correspondence between terrain modes and preset power distribution strategies, the terrain mode in the all-terrain adaptive mode including at least two of a common terrain mode, a snow mode, a mud mode, and a sand mode; and a power distribution control module, configured to switch a center differential of the vehicle to a corresponding locking mode according to the current power distribution strategy, and distribute torques to front and rear axles of the vehicle according to a torque distribution curve corresponding to the current power distribution strategy.

The torque distribution curve is a function curve using a throttle position as a variable and a torque proportion of a driven axle as an output.

According to an embodiment of the present disclosure, a vehicle power distribution control system is also provided, which may include: a road surface recognition apparatus, an all-terrain controller and a power distribution apparatus.

The road surface recognition apparatus is configured to acquire an image of a road surface on which a vehicle drives currently, and send the image of the road surface to the all-terrain controller.

The all-terrain controller is configured to start a corresponding terrain mode in an all-terrain adaptive mode according to the current type of the road surface, and determine a power distribution strategy corresponding to the current terrain mode according to a correspondence between terrain modes and preset power distribution strategies, the terrain mode in the all-terrain adaptive mode including at least two of a common terrain mode, a snow mode, a mud mode, and a sand mode.

The power distribution apparatus is configured to switch a center differential of the vehicle to a corresponding locking mode according to the current power distribution strategy, and distribute torques to front and rear axles of the vehicle according to a torque distribution curve corresponding to the current power distribution strategy.

The torque distribution curve is a function curve using a throttle position as a variable and a torque proportion of a driven axle as an output.

The above technical solution includes: acquiring an image of a road surface on which a vehicle drives currently, and recognizing the type of the road surface on which the vehicle drives currently; starting a corresponding terrain mode in an all-terrain adaptive mode according to the current type of the road surface; determining a power distribution strategy corresponding to the current terrain mode according to a correspondence between terrain modes and preset power distribution strategies; and controlling a center differential of the vehicle to switch to a locking mode corresponding to the current power distribution strategy under different power distribution strategies, and distributing, in the locking mode, torques to front and rear axles of the vehicle according to a torque distribution curve corresponding to the current power distribution strategy. The front and rear axles of a four-wheel drive vehicle can be conveniently provided with adequate torques on different road surfaces.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

Figure 1:
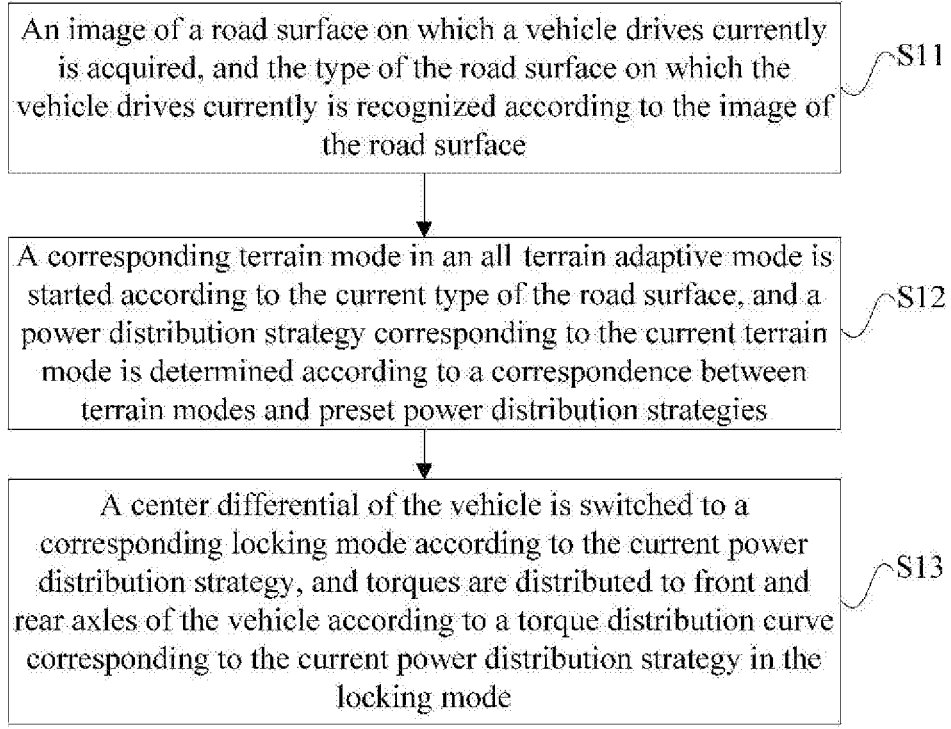
FIG. 1 is a schematic flowchart of a vehicle power distribution control method according to an embodiment.

FIG. 1 is a schematic flowchart of a vehicle power distribution control method according to an embodiment. As shown in FIG. 1, the vehicle power distribution control method in the present embodiment includes the steps as follows.

At S11, an image of a road surface on which a vehicle drives currently is acquired, and the type of the road surface on which the vehicle drives currently is recognized according to the image of the road surface.

In an embodiment, an image of a road surface on which a vehicle drives currently can be acquired in real time through a preset camera. Due to different information such as color, pixel and/or contrast of different road surface images, the state of the current road surface can be effectively recognized on the basis of an image analysis algorithm, that is, according to the road surface image, the current road surface can be recognized as a common road surface (including a common urban road surface and a common high-speed road surface), a snowy road surface, a wading road surface or sand (or gravel).

In an embodiment, the type of the road surface recognized according to the image of the road surface includes at least two of a common type, a snow type, a mud type, and a sand type.

At S12, a corresponding terrain mode in an all-terrain adaptive mode is started according to the current type of the road surface, and a power distribution strategy corresponding to the current terrain mode is determined according to a correspondence between terrain modes and preset power distribution strategies, the terrain mode in the all-terrain adaptive mode including at least two of a common terrain mode, a snow mode, a mud mode, and a sand mode.

In another embodiment, the vehicle power distribution control method further includes that: at least two power distribution strategies are preset, and a correspondence between various terrain modes in the all-terrain adaptive mode and power output strategies is established; and a correspondence between various terrain modes in the all-terrain adaptive mode and the types of road surfaces is pre-established. It will be appreciated that terrain modes in the all-terrain adaptive mode and power distribution strategies may have a one-to-one correspondence, or more terrain modes may correspond to one power distribution strategy, which may be set according to actual situations. Similarly, the correspondence between the type of a road surface and each terrain mode in the all-terrain adaptive mode may be a one-to-one correspondence, or multiple types of road surfaces correspond to one terrain mode, which may be set according to actual situations.

At S13, a center differential of the vehicle is switched to a corresponding locking mode according to the current power distribution strategy, and torques are distributed to front and rear axles of the vehicle according to a torque distribution curve corresponding to the current power distribution strategy in the locking mode.

The torque distribution curve is a function curve using a throttle position as a variable and a torque proportion of a driven axle as an output. For example: T=f (Throttle Position), where T represents the obtained torque proportion of the driven axle (i.e., the proportion of the driven axle to the total output); and Throttle Position represents the throttle position.

The center differential means that for a multi-axis drive (for example, four-wheel drive) vehicle, the drive axles are connected by a drive shaft, so that each drive axle may have different input angular velocities to eliminate the sliding of the axle drive wheels, and the center differential is mounted between the drive axles. In particular, for the four-wheel drive vehicle, the center differential is a differential disposed between the front and rear axles, and its function is to allow the front and rear axles to rotate at different speeds while transmitting power to the front and rear axles. Front and rear wheels are driven in an unequal distance in the form of pure rolling as much as possible to reduce the friction between the tires and the ground.

In another embodiment, the vehicle power distribution control method further includes that: a correspondence between power distribution strategies and locking modes of a center differential is pre-established. In different locking modes of the center differential, the maximum share of the torque of the driven axle is different in the total output torque.

In an embodiment, the locking mode of the center differential includes at least two of a smart control mode, a smart locking mode and a full locking mode. In the smart control mode, the power distribution system may adjust the locking degree of the center differential on the front and rear axles timely according to the current driving situation, that is, in this mode, the locking degree of the front and rear axles is not fixed, but may change in real time. Differently, the smart locking mode refers to maintaining the central differential at a set locking degree that is less than the maximum locking degree of the center differential on the front and rear axles. In the full locking mode, the center differential maintains the maximum locking degree on the front and rear axles. It is assumed that it is a four-wheel drive vehicle dominated by a front drive. The maximum locking degree of the center differential on the front and rear axles is 100%. When the throttle position is maximal (i.e., a throttle is fully open), the torque distribution of the front and rear axles is 50% and 50%; correspondingly, in the smart locking mode, the locking degree of the front and rear axles may be 50%, 70%, etc.; if the locking degree of the front and rear axles is 50%, the maximum torque distribution proportion of the front and rear axles may be 75%: 25%; and if the locking degree of the front and rear axles is 70%, the torque distribution proportion of the front and rear axles may be 65%: 35%. It can be seen that for the four-wheel drive vehicle dominated by a front drive, as the locking degree of the center differential on the front and rear axles is higher, the maximum torque obtained by the rear axle is greater, and vice versa, the maximum torque obtained by the rear axle is smaller. Since the torque obtained by the whole vehicle is equal to the sum of the front axle torque and the rear axle torque, the front wheel (drive wheel) is easy to slip when driving on the road surface to which a system disclosure is attached such as mud, sand and snow. The slipping part is the wasted torque. By switching the center differential to the corresponding locking mode, more torque can be distributed to the rear axle when the front wheels are slipping, so as to decrease the torque wasted by the slip, and the drive torque provided for the whole vehicle is increased.

Preferably, various power distribution strategies may implement power distribution under different situations by setting a corresponding control program in the existing power distribution system of the vehicle and coordinating the center differential through the control program, without adding a corresponding control system.

By means of the vehicle power distribution control method of the above embodiment, an image of a road surface on which a four-wheel drive vehicle drives currently is acquired, and the type of the road surface on which the vehicle drives currently is recognized; a power distribution strategy corresponding to the current type of the road surface is further determined according to the type of the road surface; and a center differential of the vehicle is controlled to switch to a locking mode corresponding to the current power distribution strategy, and in the locking mode, torques are distributed to front and rear axles of the vehicle according to a torque distribution curve corresponding to the current power distribution strategy. The four-wheel drive vehicle can drive on different road surfaces at its best.

In an embodiment, in step S11, a specific manner of recognizing the type of a road surface on which a vehicle drives currently may be: acquiring an image of a road surface on which a vehicle drives currently, and analyzing the image of the road surface to obtain road surface state information; acquiring current geographic location information of the vehicle, and determining a terrain of the current location of the vehicle according to the geographic location information; and recognizing the type of the road surface on which the vehicle drives currently in conjunction with the terrain and the road surface state information. For example, the current image of the road surface is captured by a camera, and, the current location is positioned according to a GPS or a Plough Satellite Positioning System. For example, the current road surface of the Hobq Desert may be determined as a sand road surface more accurately in conjunction with the road surface image information captured by the camera.

Under the vehicle power distribution control method in an embodiment, a driver can also manually select a terrain mode. For example, when the camera fails or the current type of the road surface cannot be, effectively determined, the selected terrain mode can be started according to the operation instruction of the driver Preferably, the vehicle power distribution control method further includes the steps that: if receiving an operation instruction for selecting a terrain mode, a terrain mode pointed by the operation instruction is compared with a terrain mode corresponding to the currently recognized type of the road surface, if the two are consistent, the terrain mode pointed by the operation instruction is started, otherwise, the terrain mode corresponding to the currently recognized type of the road surface is started. That is, after the driver manually selects the terrain mode, it can be still judged whether the manually selected terrain mode is appropriate according to the automatically recognized road surface. If not, the terrain mode can be adjusted to be appropriate, thereby avoiding the misoperation of the driver or other people in the vehicle.

In an embodiment, a specific manner of controlling a center differential of the vehicle to switch to a locking mode corresponding to the current power distribution strategy under different power distribution strategies and distributing torques to front and rear axles of the vehicle according to a torque distribution curve corresponding to the current power distribution strategy may be: acquiring the throttle position of the vehicle under different power distribution strategies, and calculating an output value of the current corresponding torque distribution curve by using the throttle position as an input parameter, that is, the torque proportion size of a driven axle. In different torque distribution curves, the correspondence between the torque proportion size of a driven axle and the throttle position is different. In other words, under different power distribution strategies, even if the throttle position is the same, the torque proportion size of the driven axle is different.

In another embodiment, the vehicle power distribution control method of the above embodiment is applied to an all-terrain control mode of the vehicle. That is, before step S11, the method further includes a step of starting the all-terrain control mode of the vehicle. For example, the all-terrain adaptive mode is started or closed by a preset control in the vehicle. When the all-terrain adaptive mode is started, the output torque of the engine is distributed in accordance with the above power distribution control method. Alternatively, the all-terrain control mode includes four terrain modes; common terrain mode, snow mode, mud mode and sand mode; and road surfaces of a common terrain type, a snow type, a mud type, and a sand type are in one-to-one correspondence with a common distribution strategy, a first distribution strategy and a second distribution strategy respectively. Refer to Table 1 specifically. It will be appreciated that the terrain mode in the all-terrain adaptive mode includes, but is not limited to, the above four types, and more different terrain modes, such as a rock mode and a grass mode, may be set according to actual conditions. Moreover, the correspondence between the terrain mode in the all-terrain adaptive mode and the power distribution strategy may also be set according to actual conditions, including but not limited to the above correspondence.

Preferably, a specific strategy of implementing step S13 is as shown in Table 1.

TABLE 1

| All-terrain adaptive mode | Common terrain mode/first distribution strategy | Distribute, in a smart control mode of a center differential, torques to front and rear axles of a vehicle according to torque distribution |

TABLE 1-continued

| | curve 1 |
|---|---|
| Snow mode/second distribution strategy | Distribute, in a smart locking mode of a center differential, torques to front and rear axles of a vehicle according to torque distribution curve 2 |
| Mud mode (sand mode)/third distribution strategy | Distribute, in a full locking mode of a center differential, torques to front and rear axles of a vehicle according to torque distribution curve 3 |

Figure 2:
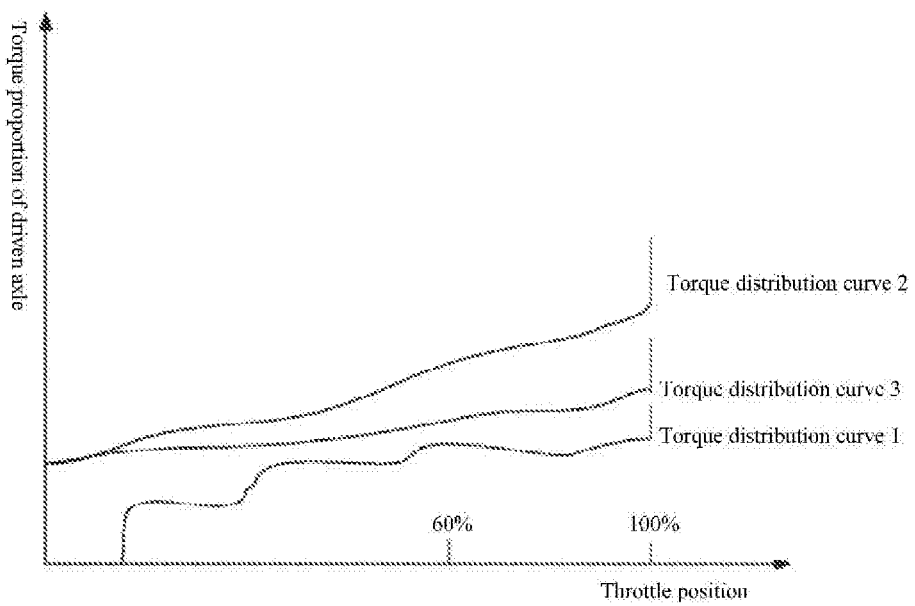
FIG. 2 is a sample diagram of different gear shift strategies of a vehicle power distribution control method according to an embodiment.

As shown in FIG. 2, torque distribution curve 1, torque distribution curve 2 and torque distribution curve 3 are all function curves using a throttle position as a variable and a torque proportion of a driven axle as an output. Alternatively, the function curve is a linear function curve, and the overall trend is that the torque proportion of the driven axle increases as the throttle position increases. When the throttle position is smaller than a certain degree (for example, 60%, the value may be different for different torque distribution curves), the torque proportion variation corresponding to the driven axle is small, and when the throttle position is greater than or equal to a certain degree (for example, 80%), the torque proportion corresponding, to the driven axle will vary significantly.

As shown in Table 1 and FIG. 2, in the common terrain mode in the all-terrain adaptive mode (common urban road or highway), a first distribution strategy is enabled. Specifically, the central differential of the vehicle is controlled to switch to a smart control mode, and a first torque proportion corresponding to the driven axle is determined according to the current throttle position and torque distribution curve 1 (first torque distribution curve). The smart control mode of the center differential refers to that: a power distribution system of the vehicle controls the locking degree of the center differential timely according to a normal mode. In addition, in this mode, the power distribution system further acquires a throttle position in real time, determines a first torque proportion corresponding to a driven axle according to the throttle position and torque distribution curve 1, and distributes torques to front and rear axles of the vehicle according to the first torque proportion. If the vehicle is dominated by a front drive, the driven axle is a rear axle; and if the vehicle is dominated by a rear drive, the driven axle is a front axle. The sum of the respective torque proportions of the front and rear axles of the vehicle is 100%. It will be appreciated that compared with the current torque distribution manner of the four-wheel drive vehicle, there is no special requirement for the torque distribution strategy in the common terrain mode.

In the snow mode in the all-terrain adaptive mode, a second distribution strategy is enabled. Specifically, the central differential of the vehicle is controlled to switch to a smart locking mode, and a second torque proportion corresponding to the driven axle is determined according to the current, throttle position and torque distribution curve 2 (second torque distribution curve). The smart locking mode of the center differential refers to that the power distribution system of the vehicle maintains the center differential at a corresponding locking degree according to the current driving situation, and the locking degree is smaller than the maximum locking degree of the center differential. In addition, in this mode, the power distribution system further acquires a throttle position in real time, determines a second torque proportion corresponding to a driven axle according to the throttle position and torque distribution curve 2, and distributes torques to front and rear axles of the vehicle according to the second torque proportion. As shown in FIG. 2, under the equal throttle position, the second torque proportion is greater than the first torque proportion, that is, under the equal throttle position, a driven wheel obtains a torque in a greater proportion than the output torque of the engine.

In the mud mode or sand mode in the all-terrain adaptive mode, a third distribution strategy is enabled. Specifically, the central differential of the vehicle is controlled to switch to a full locking mode, and a third torque proportion corresponding to the driven axle is determined according to the current throttle position and torque distribution curve 3 (third torque distribution curve). The full locking mode of the center differential refers to that the power distribution system of the vehicle maintains the center differential at the maximum locking degree. In addition, in this mode, the power distribution system further acquires a throttle position in real time, determines a third torque proportion corresponding to a driven axle according to the throttle position and torque distribution curve 3, and distributes torques to front and rear axles of the vehicle according to the third torque proportion. As shown in FIG. 2, under the equal throttle position, the third torque proportion is greater than the first torque proportion and smaller than or equal to the second torque proportion, that is, under the equal throttle position, more torque is distributed to the driven wheel compared with a common mode, but less torque is distributed compared with a snow mode.

It will be appreciated that the torque proportion of the driven axle corresponding to each torque distribution curve is relative to the current output torque of the engine, and can be expressed as a percentage specifically. The sum of the torque proportion of the driven axle and the torque proportion of the drive wheel is 100%.

In another embodiment, after a power distribution strategy corresponding to the current type of the road surface is determined in step S12, corresponding indication information may also be output through a human-computer interaction apparatus of the vehicle. For example, when the vehicle is driving on the snow after the all-terrain adaptive mode is started, the corresponding power distribution strategy can be automatically started, the current terrain mode is displayed as the snow mode through an instrument panel, and the current power distribution strategy is a snow distribution strategy (the name of the strategy can be set according to the actual situation) to remind the driver of the current power distribution strategy.

It is to be noted that, for the foregoing method embodiments, for the sake of brevity, they are all described as a series of action combinations, but those skilled in the art should understand that the present disclosure is not limited by the described action sequence, because certain steps may be performed in other sequences or concurrently in accordance with the present disclosure.

Based on the same idea as the vehicle power distribution control method in the above embodiment, the present disclosure also provides a vehicle power distribution control apparatus that can be used to execute the above vehicle power distribution control method. For the convenience of description, in the schematic structure diagram showing the embodiment of the vehicle power distribution control apparatus, only the parts related to the embodiment of the present disclosure are shown. Those skilled in the art can understand that the illustrated structure does not constitute a limitation on the apparatus, may include more or fewer parts than shown, or combine some parts, or arrange different parts.

Figure 3:
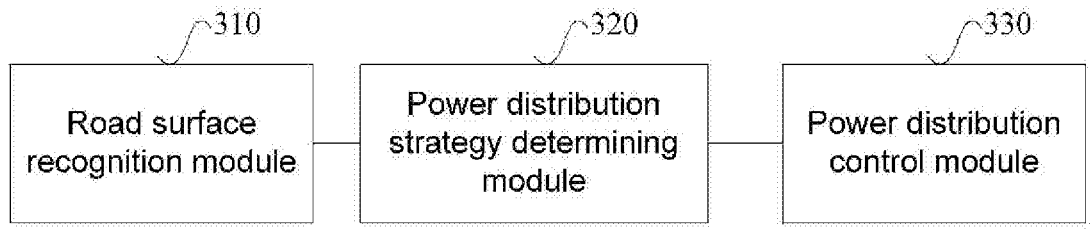
FIG. 3 is a schematic structure diagram of a vehicle power distribution control apparatus according to an embodiment.

FIG. 3 is a schematic structure diagram of a vehicle power distribution control apparatus according to an embodiment. As shown in FIG. 3, the vehicle power distribution control apparatus of the present embodiment includes: a road surface recognition module 310, a power distribution strategy determining module 320 and a power distribution control module 330 in detail as follows:

The road surface recognition module 310 is configured to acquire an image of a road surface on which a vehicle drives currently, and recognize, according to the image of the road surface, the type of the road surface on which the vehicle drives currently.

The power distribution strategy determining module 320 is configured to start a corresponding terrain mode in an all-terrain adaptive mode according to the current type of the road surface, and determine a power distribution strategy corresponding to the current terrain mode according to a correspondence between terrain modes and preset power distribution strategies, the terrain mode in the all-terrain adaptive mode including at least two of a common terrain mode, a snow mode, a mud mode, and a sand mode.

The power distribution control module 330 is configured to switch a center differential of the vehicle to a corresponding locking mode according to the current power distribution strategy, and distribute, in the locking mode, torques to front and rear axles of the vehicle according to a torque distribution curve corresponding to the current power distribution strategy.

The torque distribution curve is a function curve using a throttle position as a variable and a torque proportion of a driven axle as an output. For example: T=f (Throttle Position), where T represents the obtained torque proportion of the driven axle (i.e., the proportion of the driven axle to the total output); and Throttle Position represents the throttle position. Alternatively, the locking mode of the central differential includes at least a smart control mode, a smart locking mode and a full locking mode. The center differential may be any one of a common center differential, a multi-plate clutch type center differential, a Torsen type center differential, and a viscous coupling type center differential.

In another embodiment, the vehicle power distribution control apparatus further includes: a setting module, configured to preset at least two power distribution strategies, establish a correspondence between various terrain modes in the all-terrain adaptive mode and the power distribution strategies, and pre-establish a correspondence between various terrain modes in the all-terrain adaptive mode and the types of road surfaces. In addition, the setting module may be further configured to pre-establish a correspondence between power distribution strategies and locking modes of a center differential.

In another embodiment, the road surface recognition module 310 is specifically configured to: acquire an image of a road surface on which a vehicle drives currently, and analyze the image of the road surface to obtain road surface state information; acquire current geographic location information of the vehicle, and determine a terrain of the current location of the vehicle according to the geographic location information; and recognize the type of the road surface on which the vehicle drives currently in conjunction with the terrain and the road surface state information. The accuracy of road surface type recognition is improved accordingly.

In another embodiment, the power distribution strategy determining module 320 is further configured to compare, if receiving an operation instruction for selecting a terrain mode, a terrain mode pointed by the operation instruction with a terrain mode corresponding to the currently recognized type of the road surface, start, if the two are consistent, the terrain mode pointed by the operation instruction, otherwise, start the terrain mode corresponding to the currently recognized type of the road surface. The misoperation of the driver or other people in the vehicle can be avoided accordingly.

In another embodiment, the correspondence between various terrain modes in the all-terrain adaptive mode and power distribution strategies includes: one-to-one correspondence of a common terrain mode, a snow mode, and a mud mode, and a sand mode with a common distribution strategy, a first distribution strategy and a second distribution strategy.

In an embodiment, the power distribution control module 330 may include a first distribution control unit, a second distribution control unit and a third output distribution control unit.

The first distribution control unit is configured to control, if it is the common distribution strategy, the center differential of the vehicle to switch to a smart control mode, adjust the locking degree of the center differential in the smart control mode timely, acquire a throttle position, determine a first torque proportion corresponding to a driven axle according to the throttle position and a first torque distribution curve, and distribute torques to front and rear axles of the vehicle according to the first torque proportion. That is, there is no special requirement for power distribution in this mode.

The second distribution control unit is configured to control, if it is the first distribution strategy, the center differential of the vehicle to switch to a smart locking mode, maintain the center differential at a set locking degree, acquire a throttle position, determine a second torque proportion corresponding to a driven axle according to the throttle position and a second torque distribution curve, and distribute torques to front and rear axles of the vehicle according to the second torque proportion.

The third distribution control unit is configured to control, if it is the second distribution strategy, the center differential of the vehicle to switch to a full locking mode, maintain the center differential at a maximum locking degree, acquire a throttle position, determine a third torque proportion corresponding to a driven axle according to the throttle position and a third torque distribution curve, and distribute torques to front and rear axles of the vehicle according to the third torque proportion.

Preferably, when the throttle position is the same, the second torque proportion is greater than the first torque proportion, and the third torque proportion is greater than the first torque proportion and smaller than or equal to the second torque proportion.

It will be appreciated that in the above embodiment, the driven axle is a front axle or a rear axle, and the set locking degree is smaller than the maximum locking degree.

By means of the vehicle power distribution control apparatus of the above embodiment, an image of a road surface on which a four-wheel drive vehicle drives currently, and the type of the road surface on which the vehicle drives currently is recognized; a corresponding terrain mode in an all-terrain adaptive mode is started, and a corresponding power distribution strategy is further determined; and a center differential of the vehicle is controlled to switch to a locking mode corresponding to the current power distribution strategy, and torques are distributed to front and rear axles of the vehicle according to a torque distribution curve corresponding to the current power distribution strategy. The four-wheel drive vehicle can drive on different road surfaces at its best.

It is to be noted that since the information interaction, the execution process and the like between the modules/units are based on the same concept as the foregoing method embodiments of the present disclosure in the implementation manner of the vehicle power distribution control apparatus of the above example, the technical effects are the same as those of the foregoing method embodiments of the present disclosure. Details may refer to the description in the method embodiments of the present disclosure, and the details are not described herein again.

In addition, in the implementation manner of the vehicle power distribution control apparatus of the above example, the logical division of each functional module is merely an example. During actual application, according to requirements, for example, in view of the configuration requirements of corresponding hardware or the convenience of implementation of software, the above function assignment is performed by different functional modules, that is, the internal structure of the vehicle power distribution control apparatus is divided into different functional modules to complete all or part of the functions described above. Each functional module/unit can be implemented in the form of hardware or in the form of a software functional module.

Figure 4:
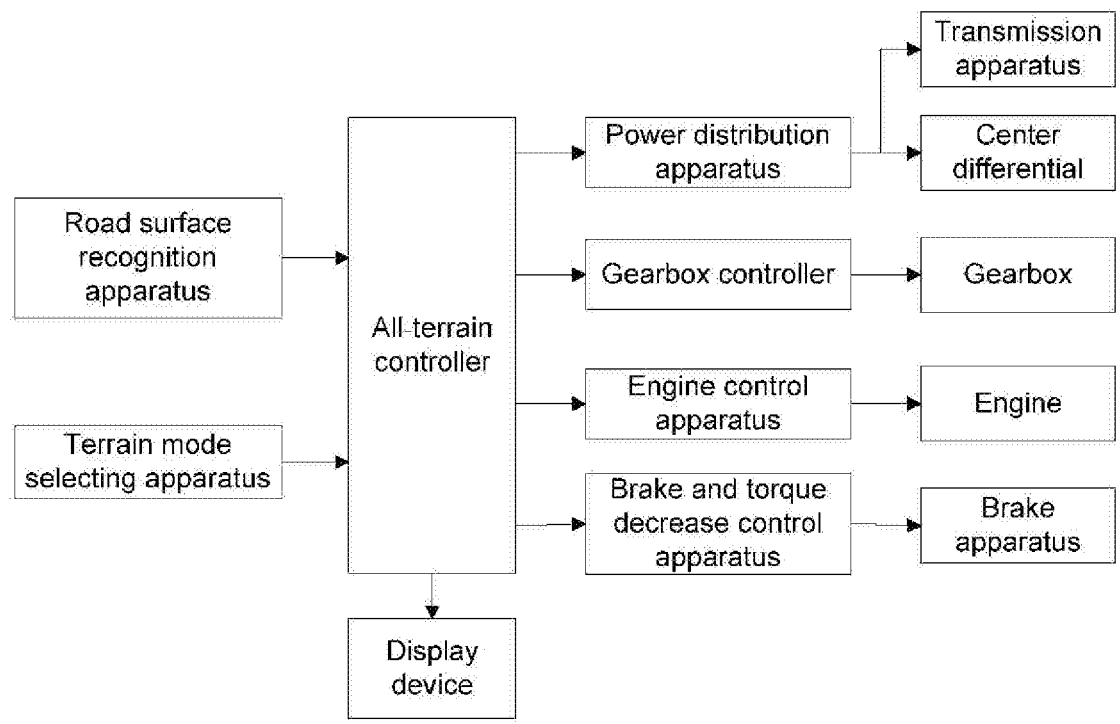
FIG. 4 is a schematic structure diagram of a vehicle power distribution control system according to an embodiment.

As shown in FIG. 4, it is a schematic structure diagram of a vehicle power distribution control system according to an embodiment. The vehicle power distribution control system includes: a road surface recognition apparatus, an all-terrain controller and a power distribution apparatus. Referring to FIG. 4, in the vehicle power distribution control system, the road surface recognition apparatus is connected to the all-terrain controller, the all-terrain controller is further connected to the power distribution apparatus, and the power distribution apparatus is further connected to a center differential of the vehicle. The all-terrain controller includes a separate controller and an integrated controller. The functions implemented by each part are as follows.

The road surface recognition apparatus is configured to acquire an image of a road surface on which a vehicle drives currently, and send the image of the road surface to the all-terrain controller.

The all-terrain controller is configured to start a corresponding terrain mode in an all-terrain adaptive mode according to the current type of the road surface, determine a power distribution strategy corresponding to the current terrain mode according to a correspondence between terrain modes and preset power distribution strategies, and send the power distribution strategy to the power distribution apparatus, the terrain mode in the all-terrain adaptive mode including at least two of a common terrain mode, a snow mode, a mud mode, and a sand mode.

The power distribution apparatus is configured to switch a center differential of the vehicle to a corresponding locking mode according to the current power distribution strategy, and distribute, in the locking mode, torques to front and rear axles of the vehicle according to a torque distribution curve corresponding to the current power distribution strategy.

The torque distribution curve is a function curve using, a throttle position as a variable and a torque proportion of a driven axle as an output. For example: T=f(Throttle Position), where T represents the obtained torque proportion of the driven axle (i.e., the proportion of the driven axle to the total output); and Throttle Position represents the throttle position. Alternatively, the locking mode of the central differential includes at least a smart control mode, a smart locking mode and a full locking mode.

In another embodiment, the road surface, recognition apparatus includes: an image collection device, a positioning device and a processor. The image collection device is configured to collect an image of a road surface on which a vehicle drives currently, and send the image of the road surface to the processor; the positioning device is configured to acquire current geographic location information of the vehicle, and send the geographic location information to the processor; and the processor is configured to analyze the image of the road surface to obtain road surface state information, determine a terrain of the current location of the vehicle according to the geographic location information, and recognize the type of the road surface on which the vehicle drives currently in conjunction with the terrain and the road surface state information. The accuracy of road surface type recognition can be improved accordingly.

In another embodiment, the vehicle power distribution control system further includes: a terrain mode selection apparatus, communicatively connected to the all-terrain controller and configured to receive an operation instruction for selecting a terrain mode, and send a terrain mode pointed by the operation instruction to the all-terrain controller. For example, a manual mechanical selection apparatus is used to send operation information to the all-terrain controller through a hard line/bus manner.

The all-terrain controller is further configured to compare, if receiving the operation instruction for selecting a terrain mode, a terrain mode pointed by the operation instruction with a terrain mode corresponding to the currently recognized type of a road surface, if the two are consistent, start the terrain mode pointed by the operation instruction, otherwise, start the terrain mode corresponding to the currently recognized type of the road surface. The misoperation of a driver or other people in the vehicle is avoided accordingly.

In another embodiment, the vehicle power distribution control system further includes: a display device, communicatively connected to the all-terrain controller, the display device being configured to display prompt information corresponding to the current power distribution strategy to remind the driver of the currently adopted power distribution strategy.

In another embodiment, the above vehicle power distribution control system further includes a gearbox controller, the all-terrain controller is further connected to the gearbox controller, and the gearbox controller may be connected to a gearbox of the vehicle. The all-terrain controller is further configured to start a corresponding terrain mode in an all-terrain adaptive mode according to the current type of the road surface, determine a power transmission strategy corresponding to the current terrain mode according to a correspondence between terrain modes and preset power transmission strategies, and send the power transmission strategy to the gearbox controller. The gearbox controller is configured to control a gearbox of the vehicle to shift gears according to the current power transmission strategy to adjust a power transmission mechanism of the gearbox.

The display device is further configured to display prompt information corresponding to the current power transmission mode to remind the driver of the currently adopted power transmission mode.

By means of the vehicle power distribution control system of the above embodiment, an image of a road surface on which a vehicle drives currently is acquired, and the type of the road surface on which the vehicle drives currently is recognized; a power distribution strategy corresponding to the current type of the road surface is determined; and under different power distribution strategies, a center differential of the vehicle is controlled to switch to a locking mode corresponding to the current power distribution strategy, and in the locking mode, torques are distributed to front and rear axles of the vehicle according to a torque distribution curve corresponding to the current power distribution strategy. A power transmission mode corresponding to the current type of the road surface may also be started, and in different power transmission modes, the gearbox of the vehicle is controlled according to different gear shift strategies to shift gears, so as to adjust a power transmission mechanism of the vehicle. Especially for a four-wheel drive vehicle, it is beneficial for the vehicle to drive on different road surfaces at its best.

In the above embodiment, descriptions of each embodiment are emphasized respectively, and parts which are not elaborated in detail in a certain embodiment may refer to relevant descriptions of other embodiments. It will be appreciated that the used terms "first", "second" and the like are used herein to distinguish objects, but these objects are not limited by these, terms.

Those skilled in the art can understand that all or part of the processes in the above method embodiments may be implemented by a computer program to instruct related hardware, and the program may be stored in a computer readable storage medium as an independent product for sales or use. The program, when executed, may perform all or part of the steps of the embodiments of the methods described above. The storage medium may be a magnetic disk, an optical disk, a Read-Only Memory (ROM), or a Random Access Memory (RAM).

The above embodiments are merely illustrative of several implementation manners of the present disclosure and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A vehicle power distribution control method, comprising:
    acquiring an image of a road surface on which a vehicle drives currently, and recognizing, according to the image of the road surface, a type of the road surface on which the vehicle drives currently;
    starting a corresponding terrain mode in an all-terrain adaptive mode according to the current type of the road surface, and determining a power distribution strategy corresponding to the current terrain mode according to a correspondence between terrain modes and preset power distribution strategies, the terrain mode in the all-terrain adaptive mode comprising at least two of a common terrain mode, a snow mode, a mud mode, and a sand mode; and
    switching a center differential of the vehicle to a corresponding locking mode according to the current power distribution strategy, and distributing torques to front and rear axles of the vehicle according to a torque distribution curve corresponding to the current power distribution strategy, the torque distribution curve being a function curve using a throttle position as a variable and a torque proportion of a driven axle as an output.

2. The vehicle power distribution control method as claimed in claim 1, further comprising:
    presetting at least two power distribution strategies, and establishing a correspondence between various terrain modes in the all-terrain adaptive mode and the power distribution strategies; and
    pre-establishing a correspondence between various terrain modes in the all-terrain adaptive mode and the types of road surfaces.

3. The vehicle power distribution control method as claimed in claim 1, further comprising:
    if receiving an operation instruction for selecting a terrain mode, comparing a terrain mode pointed by the operation instruction with a terrain mode corresponding to the currently recognized type of a road surface, if the two are consistent, starting the terrain mode pointed by the operation instruction, otherwise, starting the terrain mode corresponding to the currently recognized type of the road surface;
    and/or,
    acquiring an image of a road surface on which a vehicle drives currently, and recognizing, according to the image of the road surface, the type of the road surface on which the vehicle drives currently comprises:
    acquiring an image of a road surface on which a vehicle drives currently, and analyzing the image of the road surface to obtain road surface state information;
    acquiring current geographic location information of the vehicle, and determining a terrain of the current location of the vehicle according to the geographic location information; and
    recognizing the type of the road surface on which the vehicle drives currently in conjunction with the terrain and the road surface state information.

4. The vehicle power distribution control method as claimed in claim 1, wherein the correspondence between various terrain modes in the all-terrain adaptive mode and preset power distribution strategies comprises:
    the common terrain mode, the snow mode, the mud mode, and the sand mode respectively correspond to a common distribution strategy, a first distribution strategy and a second distribution strategy;
    the step of switching a center differential of the vehicle to a corresponding locking mode according to the current power distribution strategy and distributing torques to front and rear axles of the vehicle according to a torque distribution curve corresponding to the current power distribution strategy comprises:
    if it is the common distribution strategy, controlling the center differential of the vehicle to switch to a smart control mode, adjusting the locking degree of the center differential in the smart control mode timely, acquiring a throttle position, determining a first torque proportion corresponding to a driven axle according to the throttle position and a first torque distribution curve, and distributing torques to front and rear axles of the vehicle according to the first torque proportion;
    if it is the first distribution strategy, controlling the center differential of the vehicle to switch to a smart locking mode, maintaining the center differential at a set locking degree in the smart locking mode, acquiring a throttle position, determining a second torque proportion corresponding to a driven axle according to the throttle position and a second torque distribution curve, and distributing torques to front and rear axles of the vehicle according to the second torque proportion; and if it is the second distribution strategy, controlling the center differential of the vehicle to switch to a full locking mode, maintaining the center differential at a maximum locking degree in the full locking mode, acquiring a throttle position, determining a third torque proportion corresponding to a driven axle according to the throttle position and a third torque distribution curve, and distributing torques to front and rear axles of the vehicle according to the third torque proportion, wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

5. A vehicle power distribution control apparatus, comprising:
a road surface recognition module, acquiring an image of a road surface on which a vehicle drives currently, and recognizing, according to the image of the road surface, a type of the road surface on which the vehicle drives currently;
a power distribution strategy determining module, starting a corresponding terrain mode in an all-terrain adaptive mode according to the current type of the road surface, and determining a power distribution strategy corresponding to the current terrain mode according to a correspondence between terrain modes and preset power distribution strategies, the terrain mode in the all-terrain adaptive mode comprising at least two of a common terrain mode, a snow mode, a mud mode, and a sand mode; and
a power distribution control module, switching a center differential of the vehicle to a corresponding locking mode according to the current power distribution strategy, and distributing torques to front and rear axles of the vehicle according to a torque distribution curve corresponding to the current power distribution strategy,
wherein the torque distribution curve is a function curve using a throttle position as a variable and a torque proportion of a driven axle as an output.

6. The vehicle power distribution control apparatus as claimed in claim 5, further comprising:
a setting module, presetting at least two power distribution strategies, establishing a correspondence between various terrain modes in the all-terrain adaptive mode and the power distribution strategies, and establishing a correspondence between various terrain modes in the all-terrain adaptive mode and the types of road surfaces.

7. The vehicle power distribution control apparatus as claimed in claim 5, wherein
the road surface recognition module acquires an image of a road surface on which a vehicle drives currently, and analyzes the image of the road surface to obtain road surface state information; the road surface recognition module acquires current geographic location information of the vehicle, and determines a terrain of the current location of the vehicle according to the geographic location information; and the road surface recognition module recognizes the type of the road surface on which the vehicle drives currently in conjunction with the terrain and the road surface state information,
and/or, the power distribution strategy determining module compares, if receiving an operation instruction for selecting a terrain mode, a terrain mode pointed by the operation instruction with a terrain mode corresponding to the currently recognized type of the road surface, start, if the two are consistent, the terrain mode pointed by the operation instruction, otherwise, start the terrain mode corresponding to the currently recognized type of the road surface.

8. The vehicle power distribution control apparatus as claimed in claim 5, wherein the correspondence between various terrain modes in the all-terrain adaptive mode and preset power distribution strategies comprises:
the common terrain mode, the snow mode, the mud mode, and the sand mode respectively correspond to a common distribution strategy, a first distribution strategy and a second distribution strategy;
the power distribution control module comprises:
a first distribution control unit, controlling, if it is the common distribution strategy, the center differential of the vehicle to switch to a smart control mode, adjusting the locking degree of the center differential in the smart control mode timely, acquiring a throttle position, determining a first torque proportion corresponding to a driven axle according to the throttle position and a first torque distribution curve, and distributing torques to front and rear axles of the vehicle according to the first torque proportion;
a second distribution control unit, controlling, if it is the first distribution strategy, the center differential of the vehicle to switch to a smart locking mode, maintaining the center differential at a set locking degree, acquiring a throttle position, determining a second torque proportion corresponding to a driven axle according to the throttle position and a second torque distribution curve, and distributing torques to front and rear axles of the vehicle according to the second torque proportion; and
a third distribution control unit, controlling, if it is the second distribution strategy, the center differential of the vehicle to switch to a full locking mode, maintaining the center differential at a maximum locking degree, acquiring a throttle position, determining a third torque proportion corresponding to a driven axle according to the throttle position and a third torque distribution curve, and distributing torques to front and rear axles of the vehicle according to the third torque proportion,
wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

9. A vehicle power distribution control system, comprising: a road surface recognition apparatus, an all-terrain controller and a power distribution apparatus, wherein
the road surface recognition apparatus acquires an image of a road surface on which a vehicle drives currently, and sends the image of the road surface to the all-terrain controller;
the all-terrain controller starts a corresponding terrain mode in an all-terrain adaptive mode according to the current type of the road surface, determines a power distribution strategy corresponding to the current terrain mode according to a correspondence between terrain modes and preset power distribution strategies, and sends the power distribution strategy to the power distribution apparatus, the terrain mode in the all-terrain adaptive mode comprising at least two of a common terrain mode, a snow mode, a mud mode, and a sand mode; and the power distribution apparatus switches a center differential of the vehicle to a corresponding locking mode according to the current power distribution strategy, and distributes torques to front and rear axles of the vehicle according to a torque distribution curve corresponding to the current power distribution strategy, wherein the torque distribution curve is a function curve using a throttle position as a variable and a torque proportion of a driven axle as an output.

10. The vehicle power distribution control system as claimed in claim 9, further comprising: a terrain mode selecting apparatus, wherein the terrain mode selecting apparatus receives an operation instruction for selecting a terrain mode, and send a terrain mode pointed by the operation instruction to the all-terrain controller;

the all-terrain controller further compares, if receiving the operation instruction for selecting a terrain mode, the terrain mode pointed by the operation instruction with a terrain mode corresponding to the currently recognized type of the road surface, if the two are consistent, starts the terrain mode pointed by the operation instruction, otherwise, starts the terrain mode corresponding to the currently recognized type of the road surface; and/or, the road surface recognition apparatus comprises: an image collection device, a positioning device and a processor;

the image collection device collects an image of a road surface on which a vehicle drives currently, and sends the image of the road surface to the processor;

the positioning device acquires current geographic location information of the vehicle, and sends the geographic location information to the processor; and the processor analyzes the image of the road surface to obtain road surface state information, determines a terrain of the current location of the vehicle according to the geographic location information, and recognizes the type of the road surface on which the vehicle drives currently in conjunction with the terrain and the road surface state information.

11. The vehicle power distribution control system as claimed in claim 9, wherein the correspondence between various terrain modes in the all-terrain adaptive mode and power distribution strategies comprises:

the common terrain mode, the snow mode, the mud mode, and the sand mode respectively correspond to a common distribution strategy, a first distribution strategy and a second distribution strategy;

the power distribution apparatus:

controls, if it is the common distribution strategy, the center differential of the vehicle to switch to a smart control mode, adjusts the locking degree of the center differential in the smart control mode timely, acquires a throttle position, determines a first torque proportion corresponding to a driven axle according to the throttle position and a first torque distribution curve, and distributes torques to front and rear axles of the vehicle according to the first torque proportion;

controls, if it is the first distribution strategy, the center differential of the vehicle to switch to a smart locking mode, maintains the center differential at a set locking degree in the smart locking mode, acquires a throttle position, determines a second torque proportion corresponding to a driven axle according to the throttle position and a second torque distribution curve, and distributes torques to front and rear axles of the vehicle according to the second torque proportion; and controls, if it is the second distribution strategy, the center differential of the vehicle to switch to a full locking mode, maintains the center differential at a maximum locking degree in the full locking mode, acquires a throttle position, determines a third torque proportion corresponding to a driven axle according to the throttle position and a third torque distribution curve, and distributes torques to front and rear axles of the vehicle according to the third torque proportion, wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

12. The vehicle power distribution control method as claimed in claim 2, wherein the correspondence between various terrain modes in the all-terrain adaptive mode and preset power distribution strategies comprises:

the common terrain mode, the snow mode, the mud mode, and the sand mode respectively correspond to a common distribution strategy, a first distribution strategy and a second distribution strategy;

the step of switching a center differential of the vehicle to a corresponding locking mode according to the current power distribution strategy and distributing torques to front and rear axles of the vehicle according to a torque distribution curve corresponding to the current power distribution strategy comprises:

if it is the common distribution strategy, controlling the center differential of the vehicle to switch to a smart control mode, adjusting the locking degree of the center differential in the smart control mode timely, acquiring a throttle position, determining a first torque proportion corresponding to a driven axle according to the throttle position and a first torque distribution curve, and distributing torques to front and rear axles of the vehicle according to the first torque proportion;

if it is the first distribution strategy, controlling the center differential of the vehicle to switch to a smart locking mode, maintaining the center differential at a set locking degree in the smart locking mode, acquiring a throttle position, determining a second torque proportion corresponding to a driven axle according to the throttle position and a second torque distribution curve, and distributing torques to front and rear axles of the vehicle according to the second torque proportion; and if it is the second distribution strategy, controlling the center differential of the vehicle to switch to a full locking mode, maintaining the center differential at a maximum locking degree in the full locking mode, acquiring a throttle position, determining a third torque proportion corresponding to a driven axle according to the throttle position and a third torque distribution curve, and distributing torques to front and rear axles of the vehicle according to the third torque proportion, wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

13. The vehicle power distribution control method as claimed in claim 3, wherein the correspondence between various terrain modes in the all-terrain adaptive mode and preset power distribution strategies comprises:

the common terrain mode, the snow mode, the mud mode, and the sand mode respectively correspond to a common distribution strategy, a first distribution strategy and a second distribution strategy;

the step of switching a center differential of the vehicle to a corresponding locking mode according to the current power distribution strategy and distributing torques to front and rear axles of the vehicle according to a torque distribution curve corresponding to the current power distribution strategy comprises:

if it is the common distribution strategy, controlling the center differential of the vehicle to switch to a smart control mode, adjusting the locking degree of the center differential in the smart control mode timely, acquiring a throttle position, determining a first torque proportion corresponding to a driven axle according to the throttle position and a first torque distribution curve, and distributing torques to front and rear axles of the vehicle according to the first torque proportion;

if it is the first distribution strategy, controlling the center differential of the vehicle to switch to a smart locking mode, maintaining the center differential at a set locking degree in the smart locking mode, acquiring a throttle position, determining a second torque proportion corresponding to a driven axle according to the throttle position and a second torque distribution curve, and distributing torques to front and rear axles of the vehicle according to the second torque proportion; and if it is the second distribution strategy, controlling the center differential of the vehicle to switch to a full locking mode, maintaining the center differential at a maximum locking degree in the full locking mode, acquiring a throttle position, determining a third torque proportion corresponding to a driven axle according to the throttle position and a third torque distribution curve, and distributing torques to front and rear axles of the vehicle according to the third torque proportion, wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

14. The vehicle power distribution control apparatus as claimed in claim 6, wherein the correspondence between various terrain modes in the all-terrain adaptive mode and preset power distribution strategies comprises:

the common terrain mode, the snow mode, the mud mode, and the sand mode respectively correspond to a common distribution strategy, a first distribution strategy and a second distribution strategy;

the power distribution control module comprises:

a first distribution control unit, controlling, if it is the common distribution strategy, the center differential of the vehicle to switch to a smart control mode, adjusting the locking degree of the center differential in the smart control mode timely, acquiring a throttle position, determining a first torque proportion corresponding to a driven axle according to the throttle position and a first torque distribution curve, and distributing torques to front and rear axles of the vehicle according to the first torque proportion;

a second distribution control unit, controlling, if it is the first distribution strategy, the center differential of the vehicle to switch to a smart locking mode, maintaining the center differential at a set locking degree, acquiring a throttle position, determining a second torque proportion corresponding to a driven axle according to the throttle position and a second torque distribution curve, and distributing torques to front and rear axles of the vehicle according to the second torque proportion; and a third distribution control unit, controlling, if it is the second distribution strategy, the center differential of the vehicle to switch to a full locking mode, maintaining the center differential at a maximum locking degree, acquiring a throttle position, determining a third torque proportion corresponding to a driven axle according to the throttle position and a third torque distribution curve, and distributing torques to front and rear axles of the vehicle according to the third torque proportion, wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

15. The vehicle power distribution control apparatus as claimed in claim 7, wherein the correspondence between various terrain modes in the all-terrain adaptive mode and preset power distribution strategies comprises:

the common terrain mode, the snow mode, the mud mode, and the sand mode respectively correspond to a common distribution strategy, a first distribution strategy and a second distribution strategy;

the power distribution control module comprises:

a first distribution control unit, controlling, if it is the common distribution strategy, the center differential of the vehicle to switch to a smart control mode, adjusting the locking degree of the center differential in the smart control mode timely, acquiring a throttle position, determine a first torque proportion corresponding to a driven axle according to the throttle position and a first torque distribution curve, and distributing torques to front and rear axles of the vehicle according to the first torque proportion;

a second distribution control unit, controlling, if it is the first distribution strategy, the center differential of the vehicle to switch to a smart locking mode, maintaining the center differential at a set locking degree, acquiring a throttle position, determining a second torque proportion corresponding to a driven axle according to the throttle position and a second torque distribution curve, and distributing torques to front and rear axles of the vehicle according to the second torque proportion; and a third distribution control unit, controlling, if it is the second distribution strategy, the center differential of the vehicle to switch to a full locking mode, maintaining the center differential at a maximum locking degree, acquiring a throttle position, determining a third torque proportion corresponding to a driven axle according to the throttle position and a third torque distribution curve, and distributing torques to front and rear axles of the vehicle according to the third torque proportion, wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

16. The vehicle power distribution control system as claimed in claim 10, wherein the correspondence between various terrain modes in the all-terrain adaptive mode and power distribution strategies comprises:

the common terrain mode, the snow mode, the mud mode, and the sand mode respectively correspond to a common distribution strategy, a first distribution strategy and a second distribution strategy;

the power distribution apparatus:

controls, if it is the common distribution strategy, the center differential of the vehicle to switch to a smart control mode, adjusts the locking degree of the center differential in the smart control mode timely, acquires a throttle position, determines a first torque proportion corresponding to a driven axle according to the throttle position and a first torque distribution curve, and distributes torques to front and rear axles of the vehicle according to the first torque proportion;

controls, if it is the first distribution strategy, the center differential of the vehicle to switch to a smart locking mode, maintains the center differential at a set locking degree in the smart locking mode, acquires a throttle position, determines a second torque proportion corresponding to a driven axle according to the throttle position and a second torque distribution curve, and distributes torques to front and rear axles of the vehicle according to the second torque proportion; and controls, if it is the second distribution strategy, the center differential of the vehicle to switch to a full locking mode, maintains the center differential at a maximum locking degree in the full locking mode, acquires a throttle position, determines a third torque proportion corresponding to a driven axle according to the throttle position and a third torque distribution curve, and distributes torques to front and rear axles of the vehicle according to the third torque proportion, wherein the driven axle is a front axle or a rear axle, the set locking degree is smaller than the maximum locking degree, and when the throttle position is the same, the second torque proportion is greater than the first torque proportion, and the third torque proportion is greater than the first torque proportion and smaller than or equal to the second torque proportion.

\* \* \* \* \*